(12) United States Patent
Bruening

(10) Patent No.: US 7,010,903 B2
(45) Date of Patent: Mar. 14, 2006

(54) MACHINE FOR MOWING STALK-LIKE CROPS AND REMOVER THAT CAN BE DISASSEMBLED

(75) Inventor: Ulrich Bruening, Coesfeld (DE)

(73) Assignee: Maschinenfabrik GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/734,447

(22) Filed: Dec. 12, 2003

(65) Prior Publication Data

US 2004/0123576 A1 Jul. 1, 2004

(30) Foreign Application Priority Data

Dec. 12, 2002 (DE) ................. 102 58 013

(51) Int. Cl.
*A01D 45/02* (2006.01)
(52) U.S. Cl. .............................. 56/51; 56/62
(58) Field of Classification Search ............... 56/6, 56/51, 33, 34, 35, 53, 62
See application file for complete search history.

(56) References Cited

U.S. PATENT DOCUMENTS

| | | | | |
|---|---|---|---|---|
| 2,990,019 A | * | 6/1961 | Finn ........................ | 171/189 |
| 3,759,022 A | * | 9/1973 | Snyder et al. .............. | 56/252 |
| 4,426,828 A | * | 1/1984 | Neuerburg .................. | 56/13.6 |
| 4,538,402 A | * | 9/1985 | Muller ...................... | 56/13.6 |
| 4,662,159 A | * | 5/1987 | Muller ...................... | 56/13.6 |
| 4,907,503 A | * | 3/1990 | Ryan ......................... | 100/65 |
| 5,042,730 A | * | 8/1991 | Hundt ........................ | 241/73 |
| 5,931,396 A | * | 8/1999 | Firdaus ...................... | 241/73 |
| 6,430,907 B1 | * | 8/2002 | Wolters et al. ............. | 56/64 |
| 6,658,833 B1 | * | 12/2003 | Dunning et al. ............ | 56/202 |

FOREIGN PATENT DOCUMENTS

| | | | | |
|---|---|---|---|---|
| DE | 3815820 C1 | * | 7/1989 | |
| DE | 199 36 765 | | 8/1999 | |
| DE | 199 39 168 | | 8/1999 | |
| DE | 199 14 321 A | | 10/2000 | |
| DE | 199 33 778 | | 11/2000 | |
| DE | 199 47 288 C | | 11/2000 | ............ 56/93 |
| DE | 201 12 272 U | | 6/2001 | |
| EP | 0 508 189 | | 10/1992 | |
| EP | 0 760 200 | | 3/1997 | |
| EP | 0 760 200 A | | 3/1997 | |
| EP | 1 040 746 | | 10/2000 | |

* cited by examiner

*Primary Examiner*—Thomas B. Will
*Assistant Examiner*—Alicia Torres

(57) ABSTRACT

A machine for mowing crops includes a plurality of intake and mowing arrangements which each include a cutting disk and a plurality of conveying disks spaced vertically from each other along an upright axis of rotation. A plurality of strippers are mounted in the vicinity of the intake and mowing arrangements and define slots through which driver elements of the conveying disks pass during operation. Crop pieces accumulate in these slots and provided on the drivers of the disks for sweeping these crop pieces out of the slots are removers. These removers are in the form of elongate bars and are connected to the disks so as to be easily removable so that they may be easily replaced when worn to the extent they are no longer effective in cleaning the crop pieces from the stripper slots.

8 Claims, 3 Drawing Sheets

MACHINE FOR MOWING STALK-LIKE CROPS AND REMOVER THAT CAN BE DISASSEMBLED

FIELD OF THE INVENTION

The invention concerns a machine for mowing stalk-like crops, with a conveying element that can be put into movement, that is equipped with drivers distributed over its circumference for the transport of plant stalks, which pass through a stripper slot during the operation, where the conveying element is equipped with a remover projecting transverse to the direction of conveying, that is appropriate for removing plant material from the stripper slot, particularly accumulation of husks or leaves, as well as a remover that can be disassembled for this machine.

BACKGROUND OF THE INVENTION

EP 0 760 200 A describes a machine for harvesting corn. Intake and mowing drums that are composed of conveying disks arranged one above the other are equipped with recesses and a cutter disk is arranged underneath these and used for cutting and taking in the plants. On the rear side of the intake and mowing drums, the plants are removed from the recesses by stripper elements. The conveying disks pass through stripper slots that are defined by the stripper elements. During operation, plants accumulate in these stripper slots, particularly accumulation of husks or leaves. The accumulation of plants cause undesirable friction and impair the transport of plants through the machine.

In such machines, removers are attached to each of the leading flanks of a recess of each conveying disk in order to remove the plant remains from the stripper slots. The removers are elongated, slab-shaped elements, that in the past, have been welded over their entire length to the conveying disks. Since they wear during the operation, and removers whose edges have been rounded off tend to pull the plants into the stripper slots, an occasional replacement of the removers has been found to be useful. The welded connection, however, requires a considerable expense in terms of time and hence of cost. Alternatively, the wear of the removers can be equalized by a weld deposit with steel electrodes, which is also costly.

DE 201 12 272U and DE 199 14 321 A propose cutting elements that are attached and can be removed for plucking rolls of corn pickers. Anyone skilled in the art will have no occasion to transfer these concepts to machines of the aforementioned type.

The problem underlying the invention is seen in the need to improve a machine for mowing stalk-like crop of the aforementioned type in such a way that the replacement of the removers is simplified.

SUMMARY OF THE INVENTION

According to the present invention, there is provided an improved conveying element for use with a machine for the mowing of stalk-like crop.

An object of the invention is to provide a conveying element that includes an easily removable remover element.

In a preferred embodiment, the remover is connected to the conveying element only in its end regions, which considerably simplifies its disassembly and reattachment. Here, a plug-in connection can be provided at a first end of the remover that permits it to be plugged into the conveying element, where it is locked in a direction transverse to the plug-in direction.

The plug-in connection may include a slot in the remover in which a region of the conveying element is enclosed. On the other hand, it would also be conceivable, particularly with thicker conveying elements, that the slot be applied to the conveying element, while the remover is provided with a region that can be inserted into the slot.

While the slot as a rule locks the remover in the plane of the conveying element, that is, in the direction extending transverse to the direction of conveying, the remover may be arrested, particularly in the direction of conveying of the conveying element, by a corresponding recess in the conveying element. Analogously, here too, a recess may be provided in the remover that interacts with a corresponding characteristic of the conveying element.

The remover may be fastened to the conveying element with its second end by a welded connection that extends preferably over only a part of the length of the remover for the purpose of easier disassembly and renewed attachment.

Alternatively or in addition, the remover may also be attached to the conveying element at its second end by a screw whose longitudinal axis and axis of rotation preferably extend in the direction of conveying.

The conveying element may be of any desired configuration. It may, for example, be a conveying roll with finger-shaped drivers, whose axis of rotation may extend horizontally or vertically. It may also be chain or band conveyors circulating around two deflection points with projecting drivers (see DE 199 47 288 C). However, the invention is preferably applied to conveying elements that are provided with one or more conveying disks with at least approximately vertical axes of rotation and are equipped with recesses for the take-up of plant stalks. Then each of the drivers is located between two recesses.

In a preferred embodiment, the first end of the remover faces the axis of rotation of the conveying element. But it would also be conceivable that the first end be arranged outside and the second end inside. Furthermore, it should be noted that while the remover is preferably attached with a driver, i.e., to a conveyor disk to a trailing flank of a recess, but it is also possible to attach it to any desired other location of the conveying element, for example, to a leading flank of a recess of a conveying disk or to a slot associated with it in a conveying disk. It would also be possible to attach a first remover to any desired location on the upper side of the conveying element and/or to attach a second remover to any desired location on its underside. These removers may be connected by screws to the conveying element and preferably also to each other.

BRIEF DESCRIPTION OF THE DRAWINGS

The drawings show two embodiments of the invention that shall be described in greater detail in the following.

DESCRIPTION OF THE PREFERRED EMBODIMENT

Figure 1:
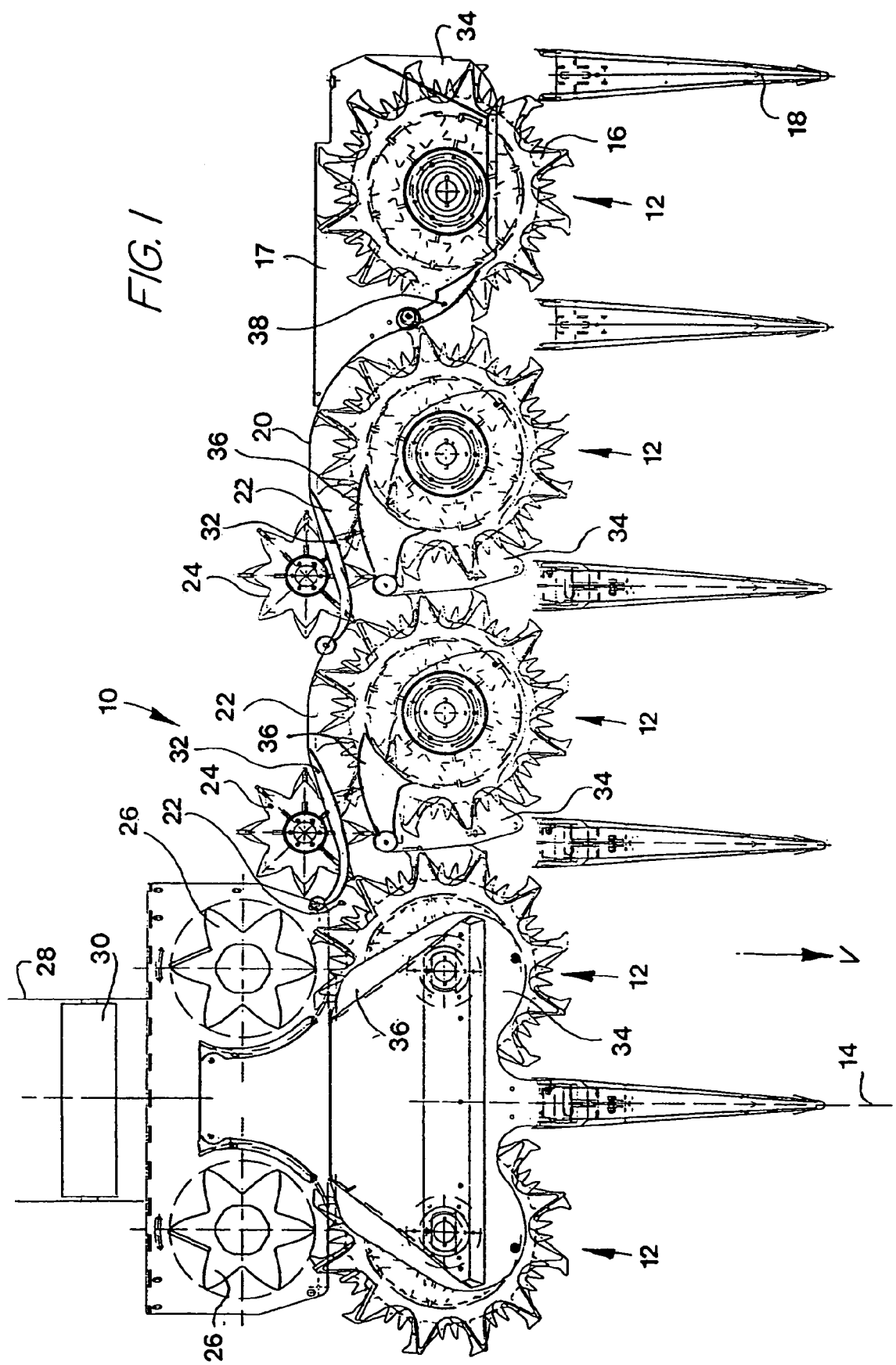
FIG. 1 shows a plan view of a machine according to the invention for moving stalk-like harvested crop.

The machine 10 shown in FIG. 1 for the mowing of stalk-like harvested crop is provided with a number of intake and mowing arrangements 12 that are arranged symmetrically about a longitudinal center plane 14 of the machine 10. For the sake of clarity, only a single intake and mowing arrangement 12 is shown to the left of the longitudinal center plane 14. However, in actual fact, equal numbers of intake and mowing arrangements 12 are provided on each side of the longitudinal center plane 14. Each of the intake and mowing arrangements 12 is composed of a lower cutting disk, not shown, that rotates about a vertical axis, and conveying disks 16 arranged coaxially above these and used as conveying elements, whose circumference is equipped with pocket-shaped recesses. Between each of the recesses, a driver is provided for the conveying of the plants. Stalk dividers 18 are arranged ahead of the intake and mowing arrangements 12. A transverse conveying channel 22 is formed between the rear side of the intake and mowing arrangements 12 and a rear wall 20 of the machine 10, through which the crop harvested by the intake and mowing arrangements 12 is transported sideways to the center of the machine 10. The elements of the machine 10 are retained by a frame 17.

The sideways transport at the transverse conveying channel 22 is supported by transverse conveying drums 24 that are driven to rotate about vertical axes and penetrate through slots in the rear wall 20. Behind the two central intake and mowing arrangements 12, as seen in the direction of operation V, slope conveyor drums 26 are arranged with their axes of rotation inclined forward, that convey the harvested crop out of the transverse conveying channel 22 to the rear into an intake channel 28 of a forage harvester with intake rolls 30 being arranged one above the other in the channel 28. The intake and mowing arrangements 12 are provided with flat covers 34.

During the harvesting process, the machine 10 is fastened to the intake channel 28 of a forage harvester and moved over a field in the forward direction of operation V. The stalk-like harvested crop that may, if necessary, be deflected to the side by stalk dividers 18 is cut by the intake and mowing arrangements 12 and conveyed into the transverse conveying channel 22. Due to the conveying action of the rear sides of the intake and mowing arrangements 12 that follow downstream and of the transverse conveying drums 24, the harvested crop reaches the rear sides of the two central intake and mowing arrangements 12, where it is deflected to the rear. There, the slope conveyor drums 26 conduct the harvested crop to the intake rolls 30 of the forage harvester, where it its chopped and deposited on a wagon.

Figure 2:
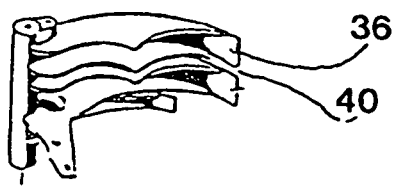
FIG. 2 shows a perspective view of a stripper element.
Figure 3:
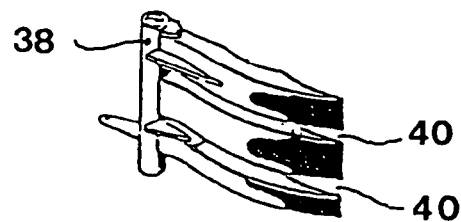
FIG. 3 shows a perspective view of another stripper element.
Figure 4:
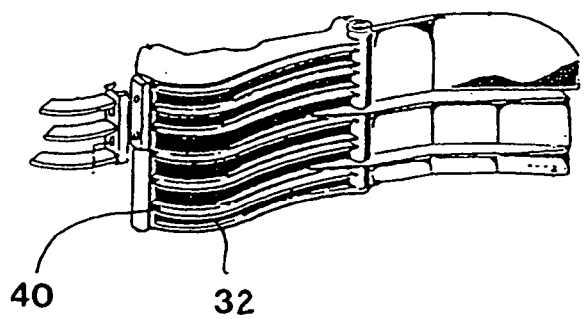
FIG. 4 shows a perspective view of a further stripper element.

At those locations at which the conveying disks 16 of the intake and mowing arrangements 12 deliver the crop to the transverse conveying channel 22, stripper elements 36 or 38 are arranged that are shown in perspective view in FIGS. 2 and 3. The stripper elements 36 of the inner intake and mowing arrangements 12 and the stripper elements 38 of the outer intake and mowing arrangements 12 are composed of sheet metal parts, arranged one above another, between which stripper slots 40 are formed in which the conveying disks 16 rotate. On the rear wall 20 of the machine 10, stripper elements 32 are also arranged that are shown in greater detail in FIG. 4. Similar stripper elements are also associated with the slope conveyor drums 26.

Thereby, the outer regions of the conveying disks 16 of the intake and mowing arrangements 12 rotate through the stripper slots 40. The stripper elements 36, 38 take the harvested crop out of the recesses of the conveying disks so that it reaches the transverse conveying channel 22 and from there into the intake channel 28 and does not continue to rotate with the conveying disks 16. The stripper elements 32 improve the conveying of the harvested crop along the rear wall 20. During the operation, plant parts accumulate little by little in the stripper slots 40 which cause undesirable friction and impair the transport of the plants.

Figure 5:
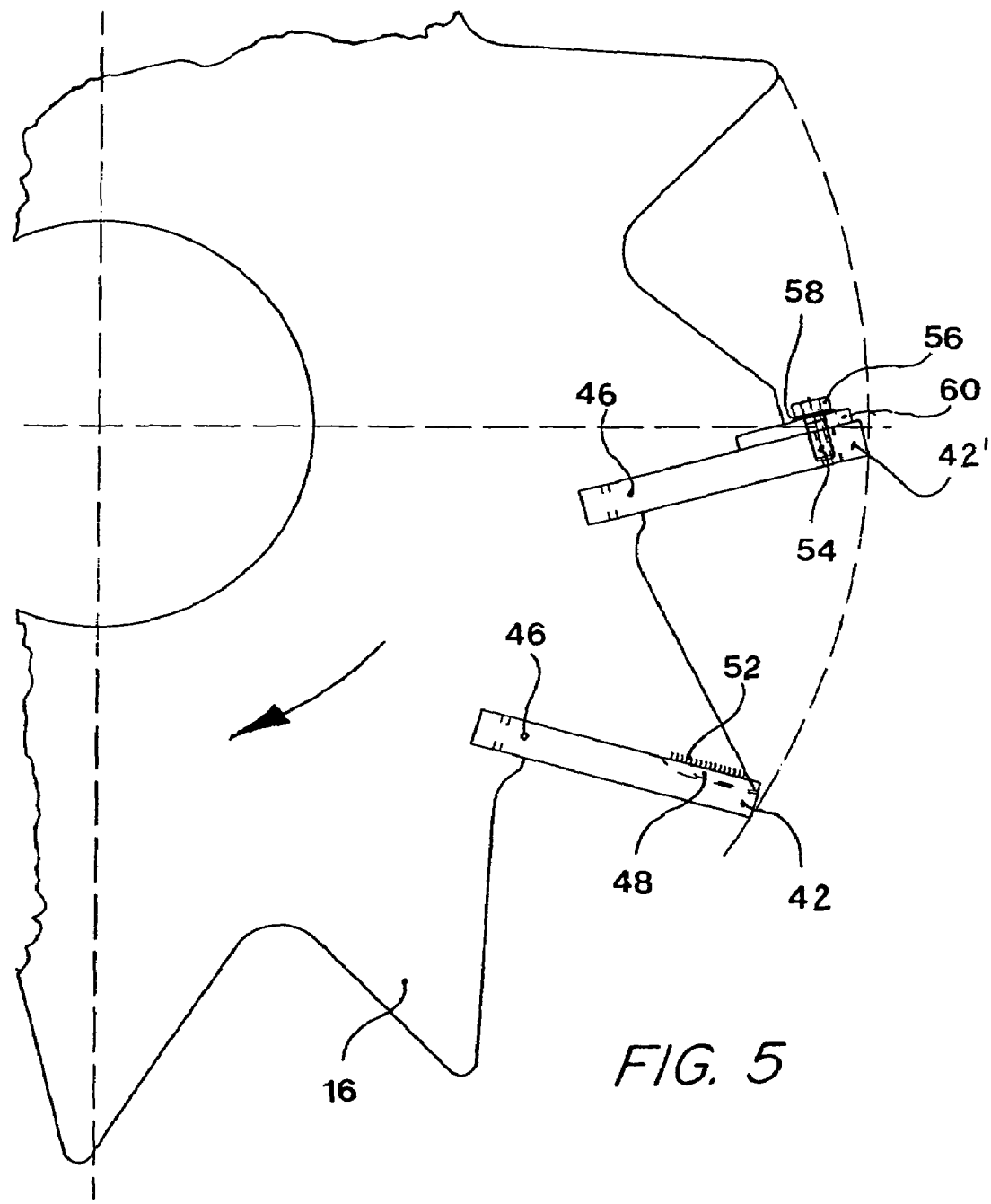
FIG. 5 shows a plan view of a conveying disk with removers in two different embodiments.

In order to remove these plant parts automatically from the stripper slots 40, a remover 42 or 42' projecting above and below the conveying disk 16 is attached in a manner known in itself to the trailing, approximately radial flank of each pocket-shaped recess of each conveying disk 16 that is shown in FIG. 5. The remover 42, 42' is an elongated element with rectangular cross section and is preferably composed of wear resistant high strength material. The removers 42, 42' extend approximately radially to the axis of rotation of the conveying disks 16. The imagined extension of the removers, however, does not intersect the axis of rotation of the conveying disk 16, but extends at an angle to the radius of the conveying disk 16 (in the embodiment shown, this angle is approximately 15°). The removers 42, 42' remove the remains of plants that are, in particular, accumulation of husks or leaves, from the stripper elements 36, 38, 32. The non-radial arrangement of the removers 42 results in a dragging mode of operation that improves the removal of undesirable material from the stripper slots 40. Furthermore, the edges of the removers 42, 42' that interact with material to be removed are located ahead of the trailing flank of the recess in the conveying disk 16, so that adequate stability for the attachment of the removers 42, 42' is assured, so that no significant change in the shape of the recesses in the conveying disk 16 ahead of and behind the remover 42 are required. Hence, these recesses can also take up and convey plant stalks without any difficulty.

The removers 42 are subject to constant wear. When they are rounded off, they tend to pull plant material into the stripper slots 40, and then lose their effectiveness.

In order to replace worn removers 42 easily, rapidly, and at low cost, the invention proposes embodiments that can be disassembled. For purposes of illustration, FIG. 5 shows two different embodiments of removers at the conveying disk 16. As noted above however, as a rule, each conveying disk 16 has only one remover; however, it would be conceivable to provide two or more removers.

Figure 6:
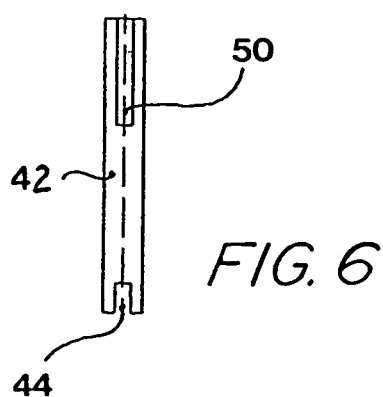
FIG. 6 shows a side view of a first embodiment of a remover.

The remover 42, according to a first embodiment, is provided with a slot 44 at a first, inner end in the plane defined by the conveying disk 16, as is shown in FIG. 6. This slot 44 engages the conveying disk 16, and has the effect that the first end of the remover 42 is locked in the vertical direction to the conveying disk 16.

The conveying disk 16 is provided with a rectangular recess 46 at the attaching point of the first end of the remover 42 whose dimension is somewhat larger in the circumferential direction than the width of the remover 42. The recess 46 has the effect of locking the remover 42 in the direction of rotation of the conveying disk 16 to the latter. Together with the slot 44, it forms a plug-in connection that can be released at the first end of the remover 42.

At its second, radially outer end, the remover 42 is connected to the conveying disk 16 by a welded connection 52. The welded connection 52 consists of a weld seam that extends at the second end of the remover 42 between the underside and/or the upper side of the conveying disk 16 of the remover 42. The welded connection 52 extends over approximately one-quarter of the length of the remover 42 from the outer edge of the conveying disk 16 inward. A projecting tongue 48 of the conveying disk 16 extends in a second slot 50 of the remover, in order to simplify the orientation and attachment of the remover 42 during the assembly and the production of the weld seam. The tongue 48 and the slot 50 may also be longer or shorter.

If the remover 42 is to be replaced, the weld connection 52 is opened (for example, with a saw or another cutting implement), the existing remover 42 is drawn to the outside along its longitudinal axis, that is, approximately radially to the axis of rotation of the conveying disk 16, a new remover 42 inserted in the opposite direction and finally welded to the conveying disk 16 in the manner shown. The replacement is performed considerably faster than with a remover welded over its entire length.

Figure 7:
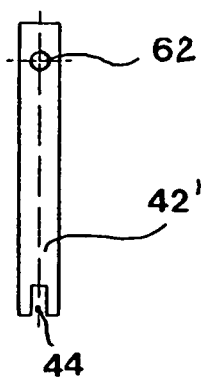
FIG. 7 shows a side view of a second embodiment of a remover.

FIG. 5 also represents a second embodiment of a remover that is characterized by the part number call-out 42', whose side view is reproduced in FIG. 7. The first, inner end of the remover 42' is locked to the conveying disk 16 by a plug-in connection composed of a slot 44 in the remover 42' and a recess 46 in the conveying disk 16, which coincides with the first embodiment of the remover 42. The second end of the remover 42' is fastened by a screw 54, that extends in the direction of rotation of the conveying disk 16 and whose head 56 is in contact over an intervening washer 58 with a retaining plate 60 which is rigidly connected to the conveying disk 16, particularly welded. The thread of the screw 54 extends in a threaded bore 62 in the remover 42'. It would also be possible to provide a nut on the other side of the bore 62 that would save having to thread the bore 62.

If the remover 42' is to be replaced, then the screw 54 is disassembled and removed. Now the remover 42' can be taken out and replaced by another, which is finally fastened again by the screw 54.

The removers 42, 42' described above can also be attached to the conveying disks of the slope conveyor drum 26 and/or the transverse conveying drums 24 where they convey plant material out of the stripper slots associated with these drums.

Having described the preferred embodiment, it will become apparent that various modifications can be made without departing from the scope of the invention as defined in the accompanying claims.

What is claimed is:

1. In a machine for mowing of crop including a mowing and intake drum mounted for rotation about an upright axis with an intake function being carried out by a conveying disk that can be brought into movement and is equipped with drivers distributed around the circumference for the transport of stalks of plants, a stripper element being mounted adjacent said conveying disk such that said drivers pass through a stripper slot, defined by said stripper element, during the operation, where at least one of said drivers of said conveying disk is provided with a remover that is appropriate for the removal of plant material from the stripper slot, the improvement comprising: said remover being fastened to said at least one of said drivers only in opposite end regions of said remover so as to be easily disassembled and said remover having a radially inner end that has a plug-in connection with said conveying disk at a radially inner location of one of said recesses, said plug-in connection being defined by a slot formed in said radially inner end of said remover, with said disk being received in said slot so as to prevent said remover from moving up or down relative to said conveying disk, whereby said remover may be easily replaced when it becomes worn.

2. In a machine for mowing of crop including a mowing and intake drum mounted for rotation about an upright axis with an intake function being carried out by a conveying disk that can be brought into movement and is equipped with drivers distributed around the circumference for the transport of stalks of plants, a stripper element being mounted adjacent said conveying disk such that said drivers pass through a stripper slot, defined by said stripper element, during the operation, where at least one of said drivers of said conveying disk is provided with a remover that is appropriate for the removal of plant material from the stripper slot, the improvement comprising: said remover being fastened to said at least one of said drivers so as to be easily disassembled, whereby said remover may be easily replaced when it becomes worn; and said drivers being defined as a plurality of spaced teeth defining a plurality of recesses about a circumference of said conveying disk; and said remover having a radially inner end that has a plug-in connection with said conveying disk at a radially inner location of one of said recesses said plug-in connection being defined by a slot formed in said radially inner end of said remover, with said disk being received in said slot so as to prevent said remover from moving up or down relative to said conveying disk.

3. The machine, as defined in claim 2, wherein said remover extends along a trailing flank of said one of said recesses, whereby said flank prevents movement of said plug-in connection in a direction opposite to a forward direction of rotation of said conveying disk.

4. The machine, as defined in claim 2, wherein a radially outer end of said remover is bolted to said disk.

5. The machine, as defined in claim 2, wherein a radially outer end of said remover is welded to said disk.

6. The machine, as defined in claim 5, wherein the length of said weld at said radially outer end of said remover is no more than half the length of said remover.

7. In a machine for mowing of crop including a mowing and intake drum mounted for rotation about an upright axis with an intake function being carried out by a conveying disk that can be brought into movement and is equipped with drivers distributed around the circumference for the transport of the stalks of plants, a stripper element being mounted adjacent said conveying disk such that said drivers pass through a stripper slot, defined by said stripper element, during the operation, where at least one of said drivers of said conveying disk is provided with a remover that is appropriate for the removal of plant material from the stripper slot, the improvement comprising: said remover being fastened to said at least one of said drivers and said remover having a radially inner end that has a plug-in connection with said conveying disk at a radially inner location of one of said recesses, said plug-in connection being defined by a slot formed in said radially inner end of said remover, with said disk being received in said slot so as to prevent said remover from moving up or down relative to said conveying disk so as to be easily disassembled, whereby said remover may be easily replaced when it becomes worn; and said remover making an angle with a radial line passing through said upright axis, with said radially inner end of said remover leading said radial line relative to a forward direction of rotation.

8. The machine, as defined in claim 7, wherein said angle is approximately 15°.

* * * * *